United States Patent [19]
Monroe

[11] Patent Number: 5,798,458
[45] Date of Patent: Aug. 25, 1998

[54] ACOUSTIC CATASTROPHIC EVENT DETECTION AND DATA CAPTURE AND RETRIEVAL SYSTEM FOR AIRCRAFT

[75] Inventor: David A. Monroe, San Antonio, Tex.

[73] Assignee: Raytheon TI Systems, Inc., Lewisville, Tex.

[21] Appl. No.: 738,487

[22] Filed: Oct. 28, 1996

Related U.S. Application Data

[63] Continuation-in-part of Ser. No. 729,139, Oct. 11, 1996.

[51] Int. Cl.⁶ .................. H04N 7/18; G11B 5/02; G06F 15/74
[52] U.S. Cl. .................. 73/587; 701/14; 360/5
[58] Field of Search .................. 73/587; 364/424.06, 364/439, DIG. 1, DIG. 2; 360/5; 342/32, 36, 357; 340/945; 701/14

[56] References Cited

U.S. PATENT DOCUMENTS

| | | | |
|---|---|---|---|
| 3,956,731 | 5/1976 | Lewis, Jr. | 340/945 |
| 4,510,803 | 4/1985 | Perara | 73/178 R |
| 4,592,034 | 5/1986 | Sachse et al. | 73/587 |
| 4,729,102 | 3/1988 | Miller, Jr. et al. | 364/424 |
| 4,816,828 | 3/1989 | Feher | 340/945 |
| 4,910,718 | 3/1990 | Horn | 367/124 |
| 4,927,299 | 5/1990 | Ramalingam et al. | 407/120 |
| 5,014,206 | 5/1991 | Scribner et al. | 364/449 |
| 5,184,516 | 2/1993 | Blazic et al. | 73/799 |
| 5,467,274 | 11/1995 | Vax | 364/424.06 |
| 5,528,557 | 6/1996 | Horn | 73/587 |

*Primary Examiner*—Hezron E. Williams
*Assistant Examiner*—Rose M. Miller
*Attorney, Agent, or Firm*—Robert C. Curfiss; Bracewell & Patterson

[57] ABSTRACT

An acoustic sensor system is provided for detecting failures or terrorist events in commercial aviation and is adapted for assisting in the detection and post event analysis of such events. The system is adapted for use in combination with a comprehensive multi-media safety and surveillance system, utilizing both visual and audio information as well as critical data to the flight crew, and to a ground tracking station, and recording the information and data generated during flight. A plurality of acoustic sensors are strategically and systematically placed about an airframe. The sensors are adapted for communicating with a monitor/recording system and may be hard wired or utilize wireless communications therewith. In the event of a catastrophic event, such as a bomb explosion, a gunshot or structural failure an acoustic event would be recorded for later analysis.

21 Claims, 11 Drawing Sheets

ACOUSTIC CATASTROPHIC EVENT DETECTION AND DATA CAPTURE AND RETRIEVAL SYSTEM FOR AIRCRAFT

RELATED APPLICATION

This application is a continuation in part of the application entitled: VIDEO AND DATA CAPTURE AND RETRIEVAL SURVEILLANCE SYSTEM FOR AIRCRAFT, invented by the present inventor and filed on Oct. 11, 1996, Ser. No. 08/729,139.

BACKGROUND OF INVENTION

1. Field of Invention

The subject invention is generally related to safety and surveillance equipment for aircraft and is specifically directed to a system for commercial aircraft wherein acoustic sensors may be utilized to determine the source of an on board incident by tracking the sound waves emanating from the source throughout the aircraft.

2. Discussion of the Prior Art

Aircraft safety is of ever increasing importance. This is particularly true with respect to commercial airlines as more and more people and freight are moved in this manner. The airways are becoming increasingly crowded with traffic. Global tracking systems are now in place to monitor the flight of the aircraft from the moment it lifts off until it safely lands at its destination. Radar and global positioning systems are commonplace both on the aircraft and at the ground tracking stations. All of these electronic systems have increased the overall safety record of commercial traffic to new standards as the number of miles flown continues to escalate.

In addition, the on board avionics including electronic monitoring and diagnostic equipment, particularly on large commercial jets, continues to evolve, giving both the on board crew and the tracking station more complete, accurate and up to date information regarding the condition of the aircraft while in flight. Flight recorders long have been incorporated in order to provide a record of each flight and in order to provide critical information to aid in the determination of the causes of an accident or malfunction should one occur.

Even with all of this information, there still remains a significant need to develop a system capable of providing additional evidence for determining the source of an explosion, gun fire or other catastrophic event after occurrence and during the investigation of an incident in an effort to determine the cause, location of and timing of the occurrence.

Such a system would also permit the recording of information providing the history of the catastrophic occurrence, further enhancing reconstruction of incidents leading to an airborne catastrophe should one occur.

While such a system would be of great benefit to the airline industry in general and to the commercial airlines in particular, there are no systems currently available which meet these needs.

SUMMARY OF THE INVENTION

The subject invention provides a low cost system for detecting failures or terrorist events in commercial aviation and is adapted for assisting in the detection and post event analysis of such events. In the preferred embodiment the system is used in combination with a comprehensive multi-media safety and surveillance system, which in the preferred form provides both visual and audio information as well as critical data to the flight crew, and to a ground tracking station, and also permits recording the information and data generated during flight. Such a system is shown and described in my copending application entitled: VIDEO AND DATA CAPTURE AND RETRIEVAL SURVEILLANCE SYSTEM FOR AIRCRAFT, invented by the present inventor and filed on Oct. 11, 1996, Ser. No. 08/729, 139, incorporated by reference herein.

The system may also be used independently to provide a low cost tracking and reconstruction system for incidents which are sound related, such as an explosion, gun fire or the like. In the preferred embodiment a plurality of acoustic sensors are strategically and systematically placed about an airframe. The sensors are adapted for communicating with a monitor/recording system and may be hard wired or utilize wireless communications therewith. In the event of a catastrophic event, such as a bomb explosion, a gunshot or structural failure an acoustic event would be recorded for later analysis. For example, a bomb explosion would send out acoustical shock waves. These would be detected at different times based on the distance from the source and on the time required for the waves to propagate in the air. The analysis of the recordings form the multiple sensors would permit calculation of the source of the explosion in three dimensions, greatly enhancing reconstruction of the incident. For example, it would not be necessary to locate the damaged portion of the airframe to determine where the bomb was located. The precise location could be reconstructed from the data on the recorder system.

The same is true of gunshots or even structural mechanical failures or other acoustical events. For example, if the right wing failed, the sensor nearest the right wing would register abnormal acoustic energy, which would propagate through the plane. The data show when the energy reached each of the plurality of sensors would pinpoint the source of the energy event.

The raw data is recorded in a "black box" recorder for later analysis. The data can also be processed by high speed electronics such as a DSP based system, wherein acoustic events can be analyzed by the aircraft computer and action can be taken. For example, if a gunshot was detected in the aft cabin of the plane, the remaining areas could be immediately sealed from entry. In addition, the pilots could be immediately notified, since many such events are not discernible to the flight crew at the time an incident occurs. Also, the occurrence of such an event could activate a radio link for transmitting events to ground stations.

In an alternative embodiment, a barometric pressure sensor in incorporated in the system to correct for acoustic propagation speed at various pressures. The data can also be tracked with navigational data such as a global positioning system (GPS) to tag the acoustic data with time, latitude, longitude and altitude data.

In its preferred form, a plurality of acoustic sensor units are placed strategically throughout the aircraft. For example, several sensors would be located directly on the airframe at strategic points, such as on the outboard strut of each wing, at each engine mount and at the inboard strut, and at various other points on the airframe. Additional acoustic sensors would be placed throughout the aircraft, for example, at various point in the passenger cabins, cargo hold and flight deck.

The system may be hardwired in the aircraft, or may use wireless transmission and receiving systems. The wireless system is particularly useful for adapting the system as a retrofit on existing aircraft and also provides assurances against disruption of data transmission and collection during a catastrophic airframe failure. In the preferred embodiment, the wireless system is fully self-contained with each sensor unit having an independent power supply. The ground communications link, monitoring and recording systems for collecting and transmitting the data are also self-contained. This assures that the system will continue to operate in the event of either a malfunction or a structural failure of the aircraft causing a disruption in power source without disruption of the generation and collection of data.

A monitor may be provided on the flight deck and recorders may be placed in the tail section, as is common for flight data and voice recorders currently in use. The flight deck would have instant live access to all of the data as it is captured by the multiple sensors and the recorder would make an historic record of the data for archive and reconstruction purposes.

Where desired, ground tracking or control stations would have selective access to the data on a near or real time basis. That is, the ground tracking station will have the capability of interrogating the in flight data while the aircraft is in flight. Near real time data can be received and historical data can be retrieved, as well, when the random access storage device is utilized.

When used in combination with the multi-media system of my aforementioned invention, the plurality of sensors are synchronized through an on board multiplexing system whereby the plurality of data, including acoustic data, may be monitored, recorded, and/or transmitted in either a parallel or serial format. In the preferred embodiment, the system is adapted for incorporating the data signal generated by the aircraft navigational data such as that provided by a global positioning system (GPS) for tracking the altitude, latitude and longitude coordinates synchronized with the collected data in order to provide accurate information of where the aircraft is in its flight plan when an incident occurs. A time or chronology signal may also be incorporated in the data scheme. Any signal which is capable of being captured and stored may be monitored in this manner. By tying each of the images to a reference such as the GPS signal and a clock, the retrieval of data and reconstruction of an on board incident is facilitated.

Utilizing the wireless system of the invention in combination with the battery back-up power supply, it is possible to continue collecting information even after an airframe failure and a disruption in aircraft power.

Preferably, the entire capture, retrieval, monitor and archive system is installed utilizing a wireless transmitting/ receiving system in order to assure that transmission will not be lost in the event of a power shutdown or a structural failure causing possible open circuit conditions which could occur in a hard wired system. In the preferred embodiment, such a system would be completely self-contained with an integrated power supply.

It is, therefore, an object and feature of the subject invention to provide an acoustic sensor system for detecting the location of catastrophic events in commercial aviation.

It is an additional object and feature of the subject invention to provide an inexpensive system for detecting such events in a manner permitting accurate post event analysis.

It is also an object and feature of the subject invention to provide an acoustic detection and retrieval system that can be used in combination with a comprehensive, multi-media data generating, collecting, displaying, transmitting, receiving and storage safety and surveillance scheme for aircraft.

It is also an object and feature of the subject invention to provide acoustic surveillance and detection of acoustic energy events of critical components and areas of an aircraft during flight.

It is an additional object and feature of the subject invention to provide an acoustic energy record of critical components and areas of an aircraft during flight for archival and retrieval purposes.

It is yet another object and feature of the subject invention to provide apparatus for permitting ground personnel to receive data relating to critical components and areas of and aircraft during flight.

It is a further object and feature of the subject invention to provide accurate information of where the aircraft is during a flight path when a specific event occurs.

It is also an object and feature of the subject invention to provide a system for linking recorded acoustic data with an inertial navigation system such or other navigational data source such as, by way of example, a global positioning system for archival purposes.

It is still another object and feature of the invention to permit the monitoring, storing and retrieval of any of a variety of video images, acoustic signals and performance data by the tracking, surveillance and imaging equipment on board the aircraft.

Other objects and features of the subject invention will be readily apparent from the accompanying drawings and detailed description of the preferred embodiments.

DETAILED DESCRIPTION OF THE PRAEFERRED EMBODIMENTS

Figure 1:
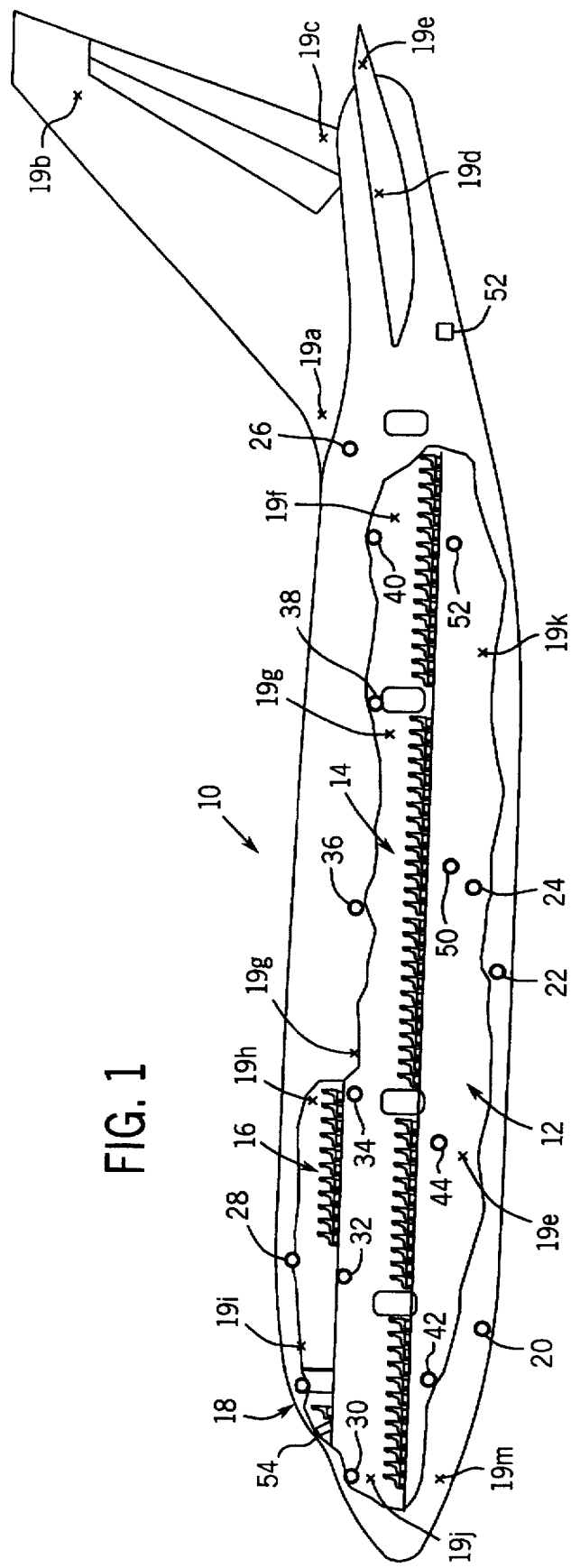
FIG. 1 is a cutaway illustration of the fuselage of an aircraft showing sample placement of acoustic sensor devices in accordance with the invention.

FIG. 1 shows a cutaway diagram of a typical commercial airline fuselage 10, with the cargo hold 12, the passenger cabins 14, 16 and the flight deck or cockpit 18 partially visible. In the embodiment shown, multiple audio sensor devices 19a, 19b, 19c, 19d, 19e, 19f, 19g, 19h, 19i, 19j, 19k, 19l and 19m are strategically placed throughout the airframe and the cabin area for detecting acoustic energy and transmitting a signal which may be transmitted to ground, recorded in a "black box" recorder, monitored on board, and/r analyzed for action. The recorded signals are invaluable in locating the source of an onboard acoustic event such as a bomb exploding, a structural failure or a gunshot or the like. Additional sensors could also be utilized, the sensors 19a-19m are shown just to provide an example of placement in order to illustrate the teachings of the subject invention. For example, if a structural failure occurred at the point where of the forward section of the tail section joins the fuselage, this would create a detectable acoustic energy incident which would first be detected by the sensor 19a. As the acoustic wave propagates through the airframe, it would be detected by the various sensors at different times based on their distance from the source, which is nearest sensor 19a. As the wave dissipates, it is likely that remote sensors, such as sensors 19j, 19l and 19m may not detect any discernible signal. The time and intensity of the detected signal at each of the sensors 19a-19m will permit reconstruction of the event, pinpointing where the failure or event occurred. By tying the acoustic signal to a chronolog, barometric pressure and navigational tracking signals, as will be explained herein, the acoustic data can be used to reconstruct the precise location, time and intensity of an event. This will greatly enhance the ability to reconstruct an event and will also permit corrective action to be taken while in flight, where possible.

In the preferred form, the acoustic sensor system of the invention is designed to be a stand-alone system providing a low-cost surveillance and detection system for monitoring, recording and reconstructing acoustic events. However, as illustrated herein, the acoustic sensor system can be used in combination with the multi-media, comprehensive surveillance and data collection scheme of my copending application entitled: VIDEO AND DATA CAPTURE AND RETRIEVAL SURVEILLANCE SYSTEM FOR AIRCRAFT, invented by the present inventor and filed on Oct. 11, 1996, Ser. No.: 08/229,139, incorporated by reference herein and of which this application is a continuation-in-part.

In the embodiment shown in FIG. 1, a number of video image sensor devices such as, by way of example, analog video cameras, are also strategically placed throughout the aircraft and may be mounted inside the skin of the aircraft and aimed through openings provided in the fuselage to focus on critical components of the aircraft, such as the landing gear cameras 20, 22, the wing engine camera 24 and the tail camera 26. Similar devices or cameras may also be strategically placed throughout the interior of the aircraft, such as the passenger cabin cameras 28, 30, 32, 34, 36, 38, 40, the cargo bay cameras 42, 44, 46, 48 and the flight deck camera 50. The placement and number of devices is a matter of choice depending upon the configuration of the aircraft and the level of surveillance desired.

In the embodiment shown and described, a multi-media flight recorder or "black box" 52 is installed in the tail section of the aircraft, in the same manner as the current data and voice black boxes (not shown). A flight deck monitor and control panel 54 is located on the control panel in the cockpit 18. Other monitors may be provided where desired.

Figure 2:
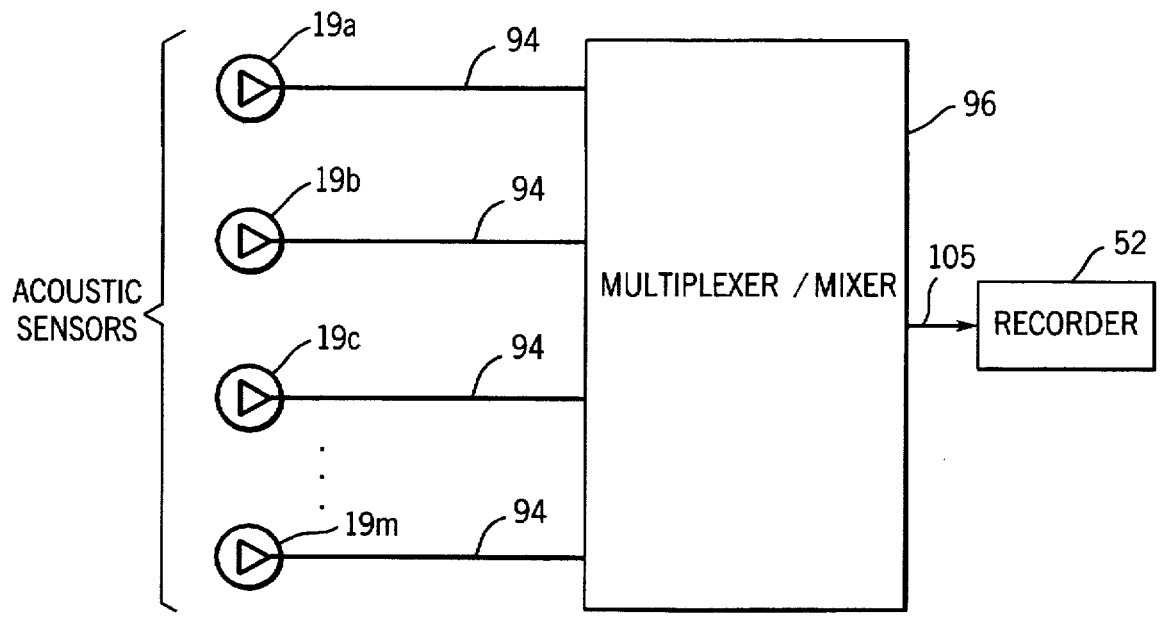
FIG. 2 is a block diagram of a basic system utilizing acoustic sensors, a multiplexer/mixer and a "black box" recorder.

Turning now to FIG. 2, in its most basic form, the system of the subject invention incorporates a plurality of strategically positioned analog acoustic sensors 19a-19m each having an output line 94 for feeding the raw signal into a multiplexer/mixer 96 for producing a combined, multiplexed output signal on line 105 for introduction into a single channel analog recorder 52.

Figure 3:
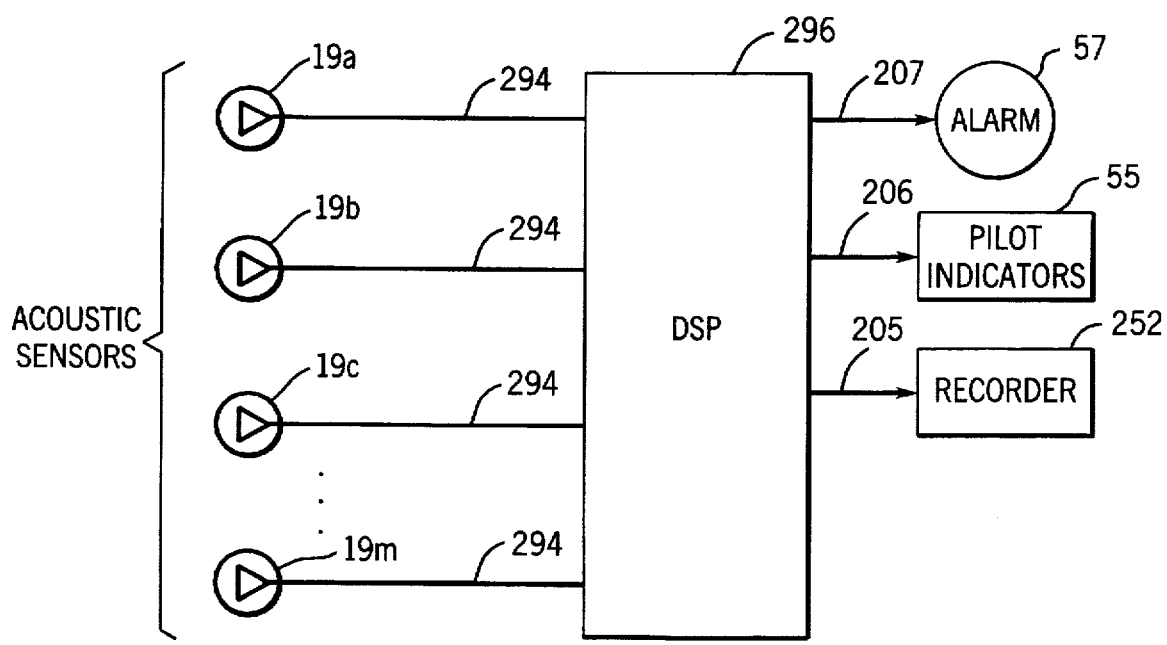
FIG. 3 is a block diagram of the basic system utilizing digital signal processing (DSP) with an alarm system, a pilot monitoring system and a "black box" recorder.

A similar system utilizing digital acoustic devices for the sensors 19a-19m is shown in FIG. 3. In this embodiment, each of the digital output signals from the various sensors 19a-19m is produced on lines 294 where they are introduced into the digital system processor (DSP) for producing a digital multiplexed signal on line 205 for introduction into a digital recording system 252. Where desired, the output signal can also be fed via line 206 to a pilot monitor 55 and via line 207 to an alarm system 57. Of course, the pilot monitor and alarm system can also be incorporated in the system of FIG. 2.

Figure 4:
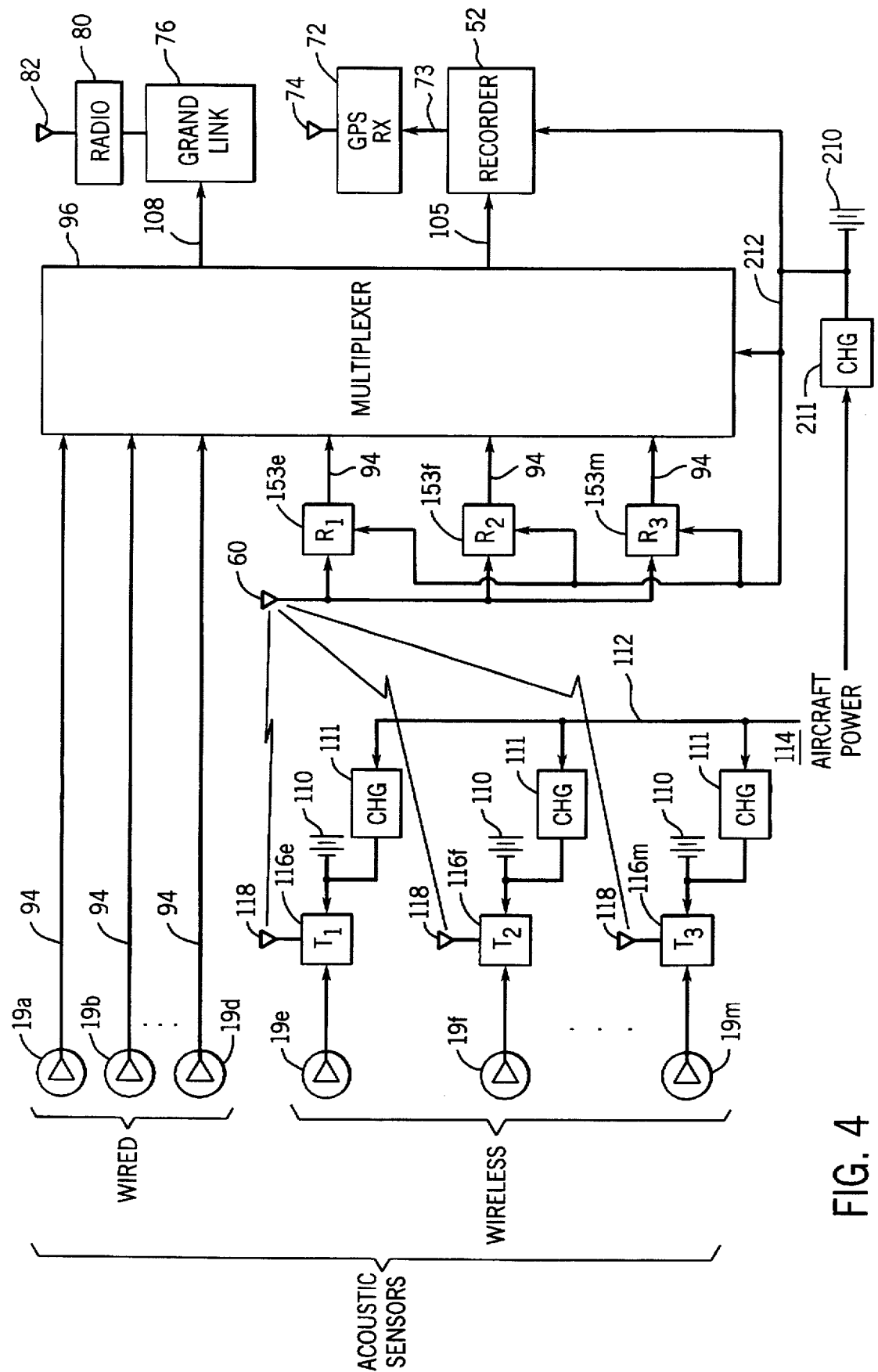
FIG. 4 is a block diagram showing a combination of hard-wired and wireless sensors.

In its preferred form, at least some of the sensors 19a-19m, if not all, will transmit their signals to the collector/processing equipment via wireless transmission. As shown in FIG. 4, the basic multiplexing system of FIG. 2 can incorporate both wired sensors (19a-d) and wireless sensors (19e-m). As there shown, the wired sensors 19a-19d are wired directly to the multiplexer 96 in the same manner as shown in FIG. 2. The wireless sensors 19e-19m provide a raw output data signal to a local, dedicated transmitter 116e-16m, respectively for transmitting a signal via the dedicated antenna 118 to a receiving antenna 60. The receiving antenna then transmits the received signals to the dedicated receivers 153a-153m, respectively, where they are introduced via dedicated input lines 94 into the multiplexer.

In the preferred embodiment, each wireless sensor 19e-19m includes an integrated power supply such as the rechargeable battery system incorporating the battery 110 and the charger 111. This assures continuous transmission of the data signal even in the event of an airframe structural failure and/or the loss of aircraft power. Typically, the rechargeable system is coupled to aircraft power 114 via a distribution line 112. It is also desirable that the collector/processor system also be self-contained, with a rechargeable system comprising the battery 210, charger 211 and distribution line 212 also being coupled to aircraft power 114.

As previously described, the multiplexer 96 generates a combined output signal on line 105 for introduction into the "black box" recorder 52. Where desired, a ground link system can be incorporated in any of the embodiments, wherein the output data signal as shown on line 108 can be input into a ground link transceiver 76 and transmitted via radio 80 and antenna 80 to a ground control station, as more fully described in my aforementioned copending application. As also more completely described in that application, it is desirable to track the time, latitude, longitude, and altitude with the collected signals. This is of great value when reconstructing an in-air incident. As shown in FIG. 4, a navigational tracking system such as a global positioning system (GPS) can be recorded with the recorded acoustic data. In the illustrated embodiment, the GPS receiver 72 receives a signal via antenna 74 and introduces the GPS signal into the recorder system via line 73.

Figure 5:
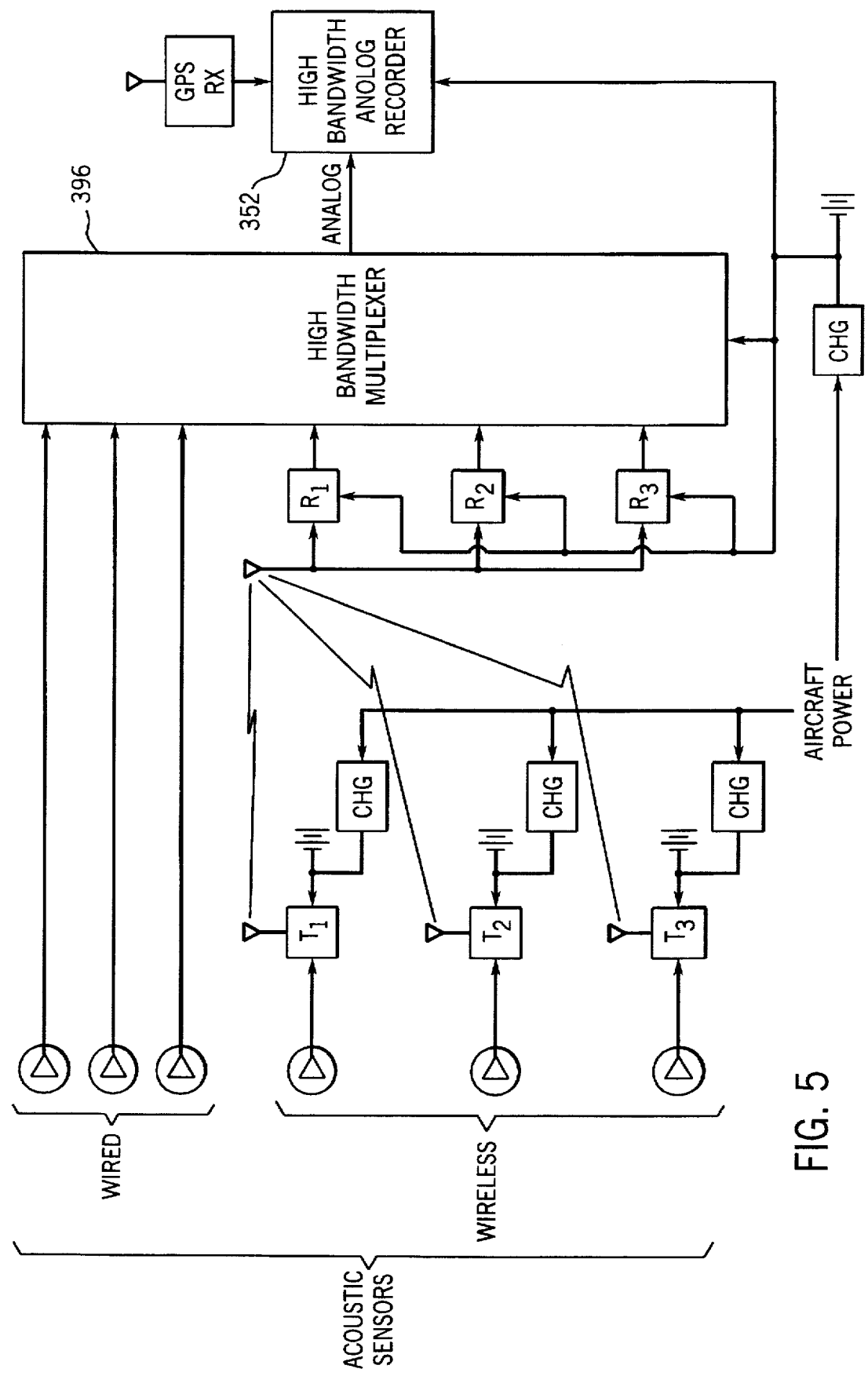
FIG. 5 is similar to FIG. 4, utilizing a high bandwidth analog recorder.
Figure 6:
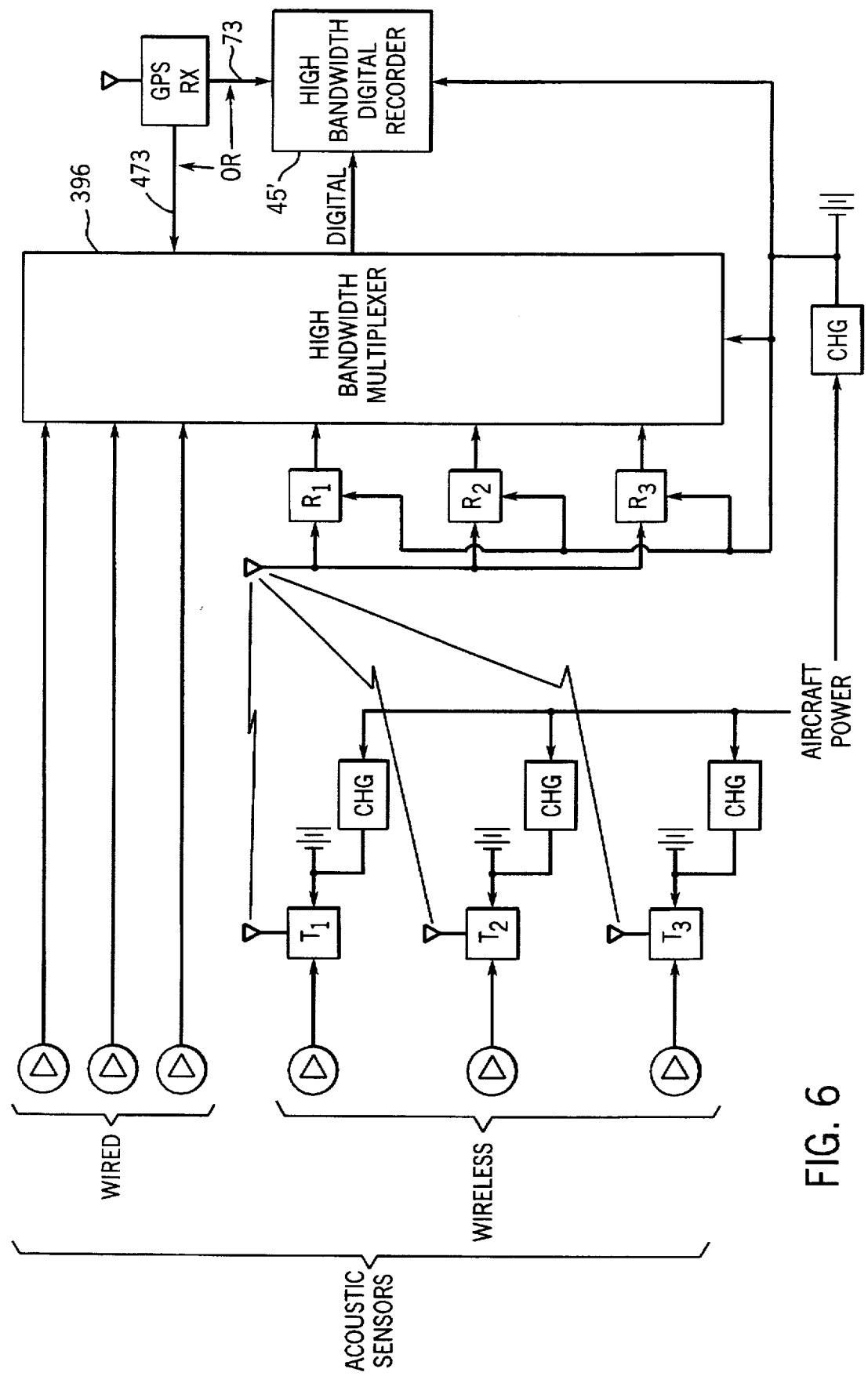
FIG. 6 is similar to FIG. 5, utilizing a high bandwidth digital recorder.
Figure 7:
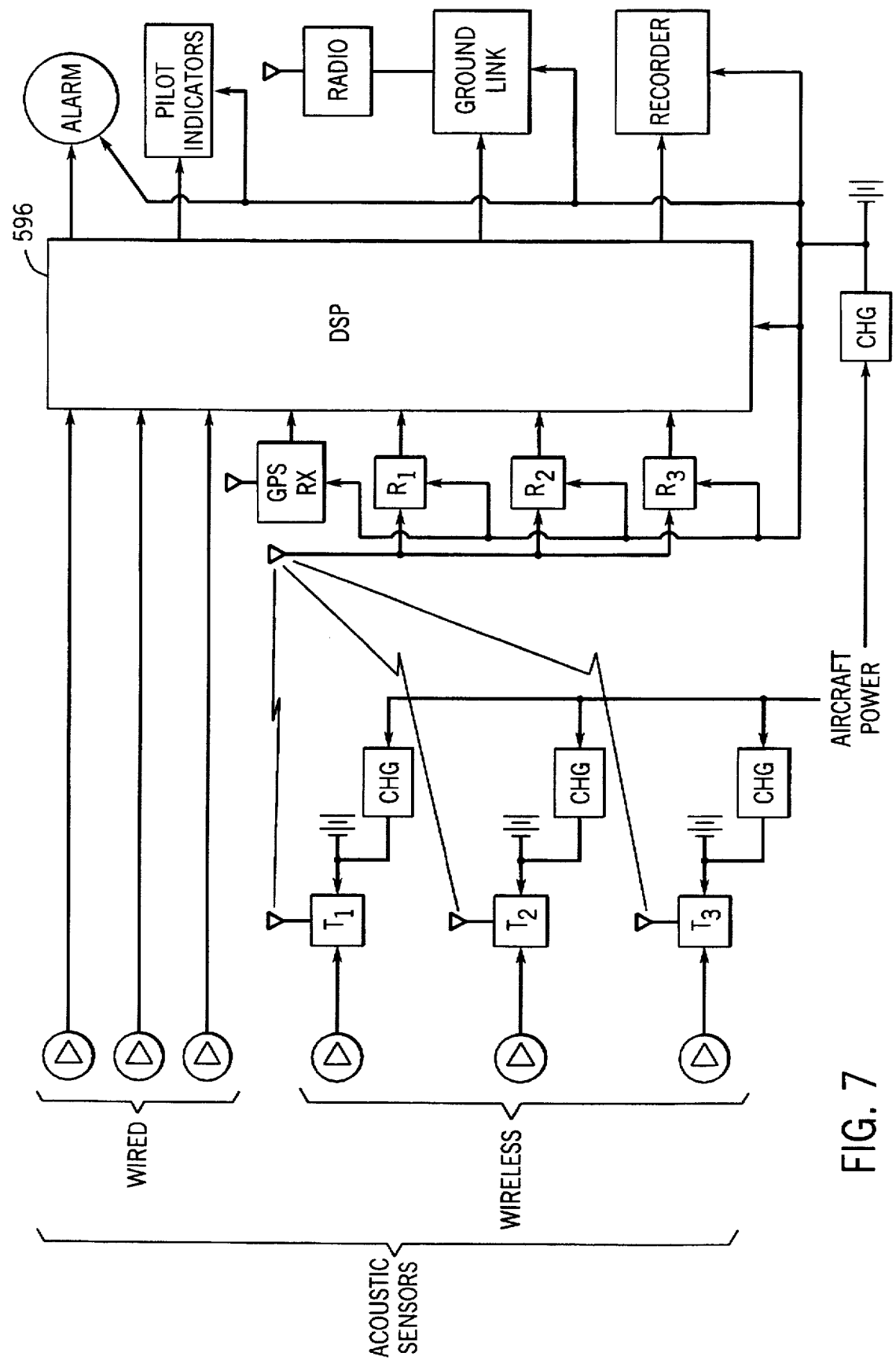
FIG. 7 is a block diagram showing a combination of hard-wired and wireless sensors utilizing DSP processing.

A modified system similar to FIG. 4 is shown in FIG. 5. In this system a high-bandwith multiplexer 396 is substituted for the multiplexer 96 and a high bandwidth analog recorder 352 is substituted for the recorder 52. The use of high bandwidth technology permits the collection of data at greater speeds, permitting more data to be collected and recorded by permitting faster cycling time of the multiplexer through the various sensor inputs. As is explained later herein, this is of critical importance when tracing an explosion or other acoustic incident back to its source using only acoustic data. As shown in FIG. 5, the same system may incorporate high bandwidth digital recording techniques utilizing a high bandwidth digital recorder 452. As there shown, the GPS signal may introduced directly into the recorder via line 73, as previously described, or may be multiplexed with the other data by introducing the GPS signal into the multiplexer 396, as indicated by line 473.

Where desired, digital signal processing (DSP) may be substituted for the multiplexer technology illustrated in FIGS. 2–6. An exemplary block diagram of a digital signal processing system is illustrated in FIG. 7, with the processor 596 substituted for the multiplexing system. The remaining components function generally as described with respect to the embodiments of FIGS. 2–6.

Figure 8:
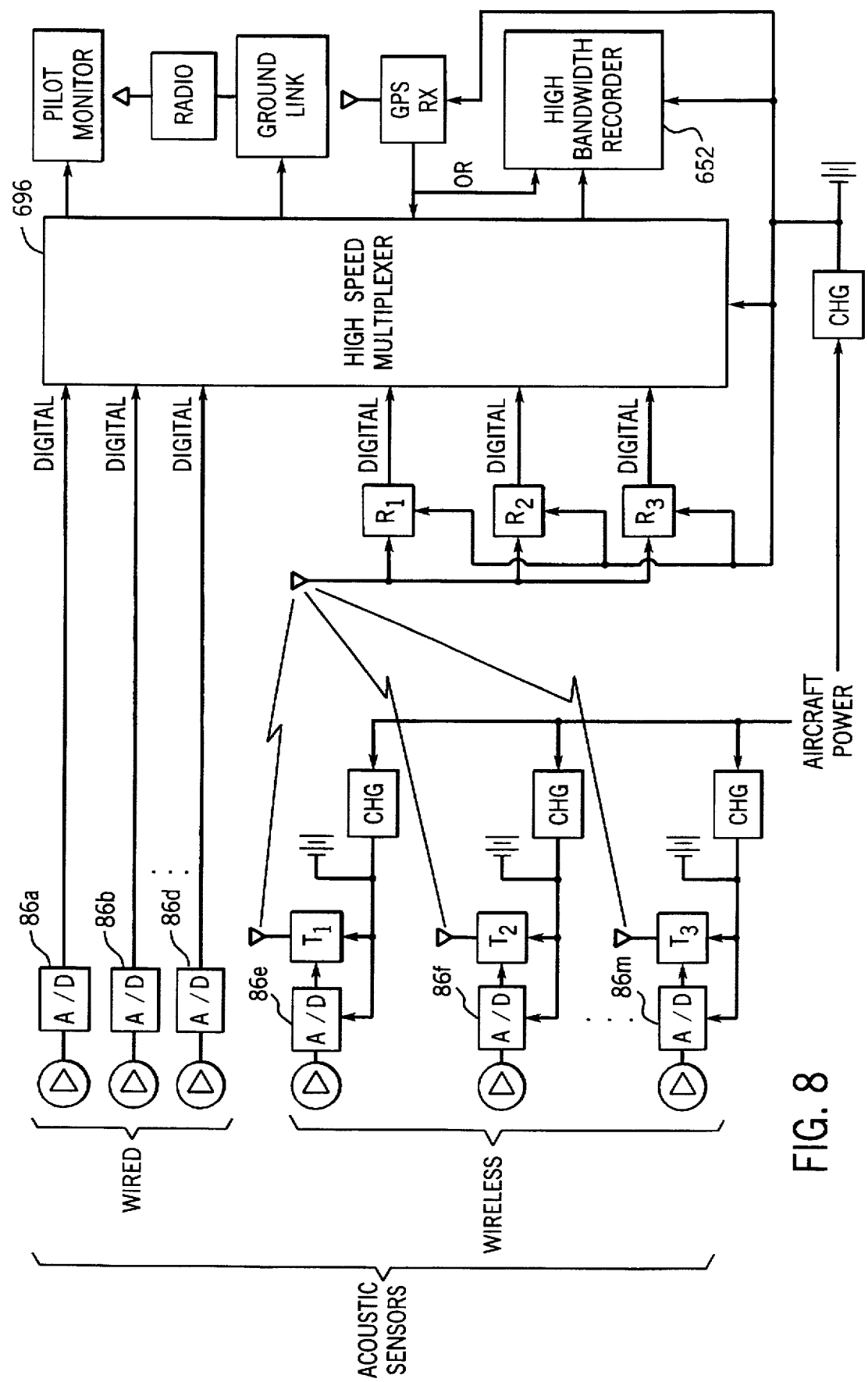
FIG. 8 is a block diagram utilizing digital sensors in combination with high speed multiplexing.
Figure 9:
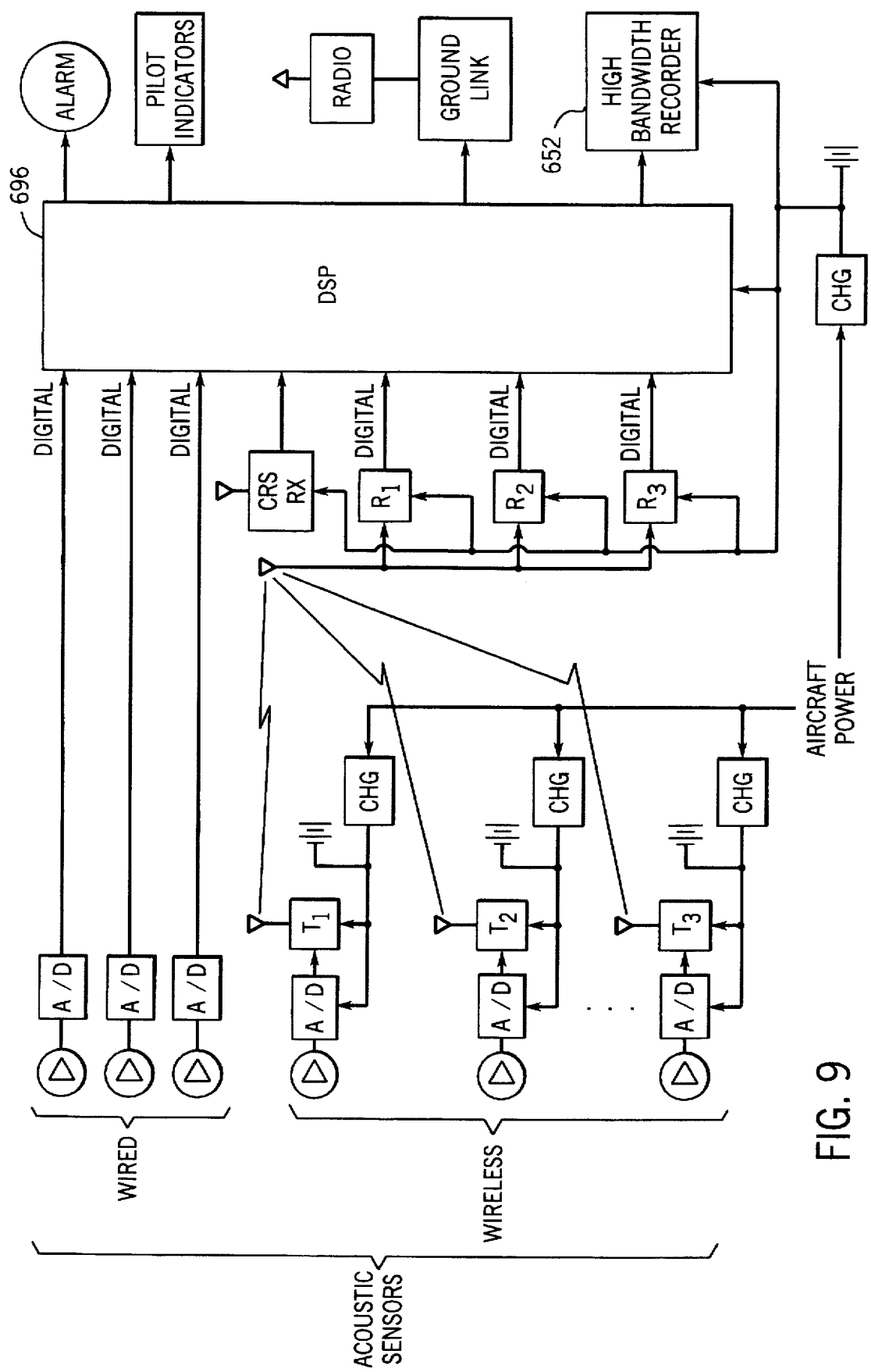
FIG. 9 is similar to FIG. 8, showing DSP processing.

The system may be fully analog, as shown in FIGS. 2–6 or may incorporated digital processing with analog sensors, as shown in FIG. 8, for example. The digital processing will provide higher speed processing and better random searching capability. When analog sensors are utilized each raw data signal from the various sensors 19a–19m is converted into a digital signal via dedicated converters 86a–86m. The remainder of the system functions generally as previously described. Of course, the multiplexer 696 and the recorder 652 are of a digital configuration. As shown in FIG. 9, the same analog to digital conversion system can also be used with digital signal processors with the DSP processor 796 substituted for the digital multiplexer 696.

Figure 10:
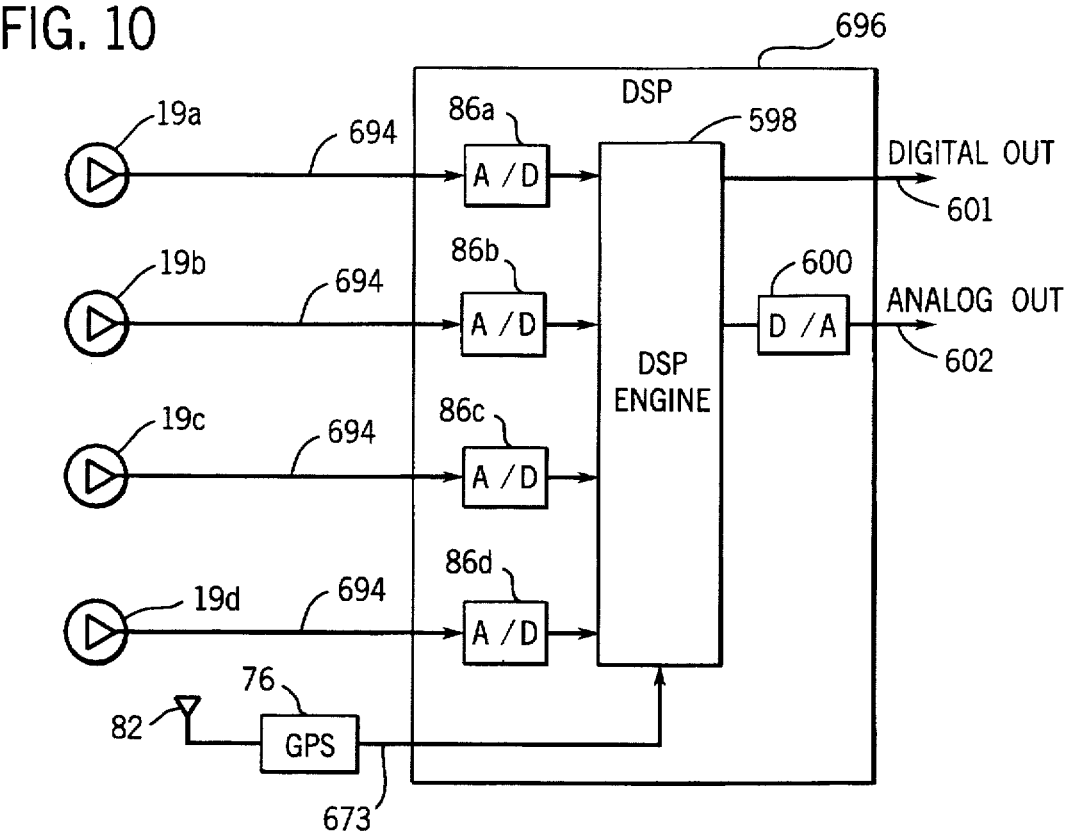
FIG. 10 shows a DSP based system utilizing analog sensors.

The basic DSP based system is more clearly illustrated in FIG. 10. In the embodiment shown, only the hardwired sensors 19a–19d are illustrated. It should be understood that wireless sensors could be substituted or could be used in combination with the hardwired sensors, as previously described. In either case, a raw data analog signal is present from each sensor on the dedicated line 694. The DSP processor includes a dedicated analog to digital converter 86a–86d for each sensor 19a–19d for producing a digital signal to be introduced into the DSP engine or processor 598. As previously described, the digital GPS signal on line 673 may be introduced directly into the DSP system. A digital output signal is produced on line 601 for distribution as previously described, to a recorder, ground link or monitor. Where desired, an analog output signal may also be produced on line 602 by converting the DSP output from digital to analog utilizing the digital to analog converter 600. The analog signal on line 602 may also be distributed as desired to various analog instruments. The digital signal processing system, while more costly than basic multiplexing, provides enhanced processing. For example, in addition to the basic multiplexing capability, a digital processor can be used to detect an event at the time of occurrence. This might trigger a ground link activation or a pilot monitor. The digital processor also will provide for direct time code insertion, timing analysis and spectral analysis to assist in the reconstruction of an event from the recorded data.

Figure 11:
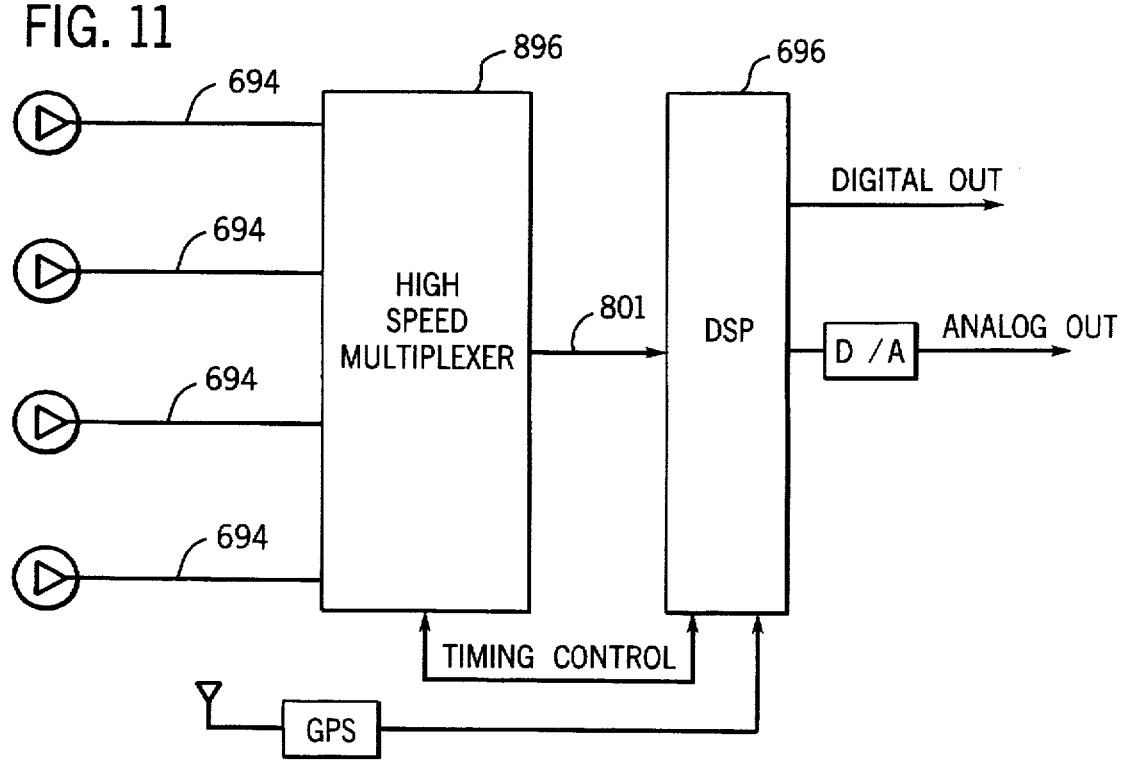
FIG. 11 shows a DSP based system utilizing a high speed multiplexer.

As shown in FIG. 11, an even faster system is provided by placing a high speed multiplexer 896 in advance of the digital processor 696. This permits a single multiplexed input signal 801 to be introduced into the processor 801, greatly increasing the speed of the processor by reducing the amount of data to be assimilated. As explained later herein, timing is of critical importance when tracking the propagation of an acoustic wave from its source. Therefore, providing higher speed processing is very desirable when cost is not a driving factor in the design of the system.

Figure 12:
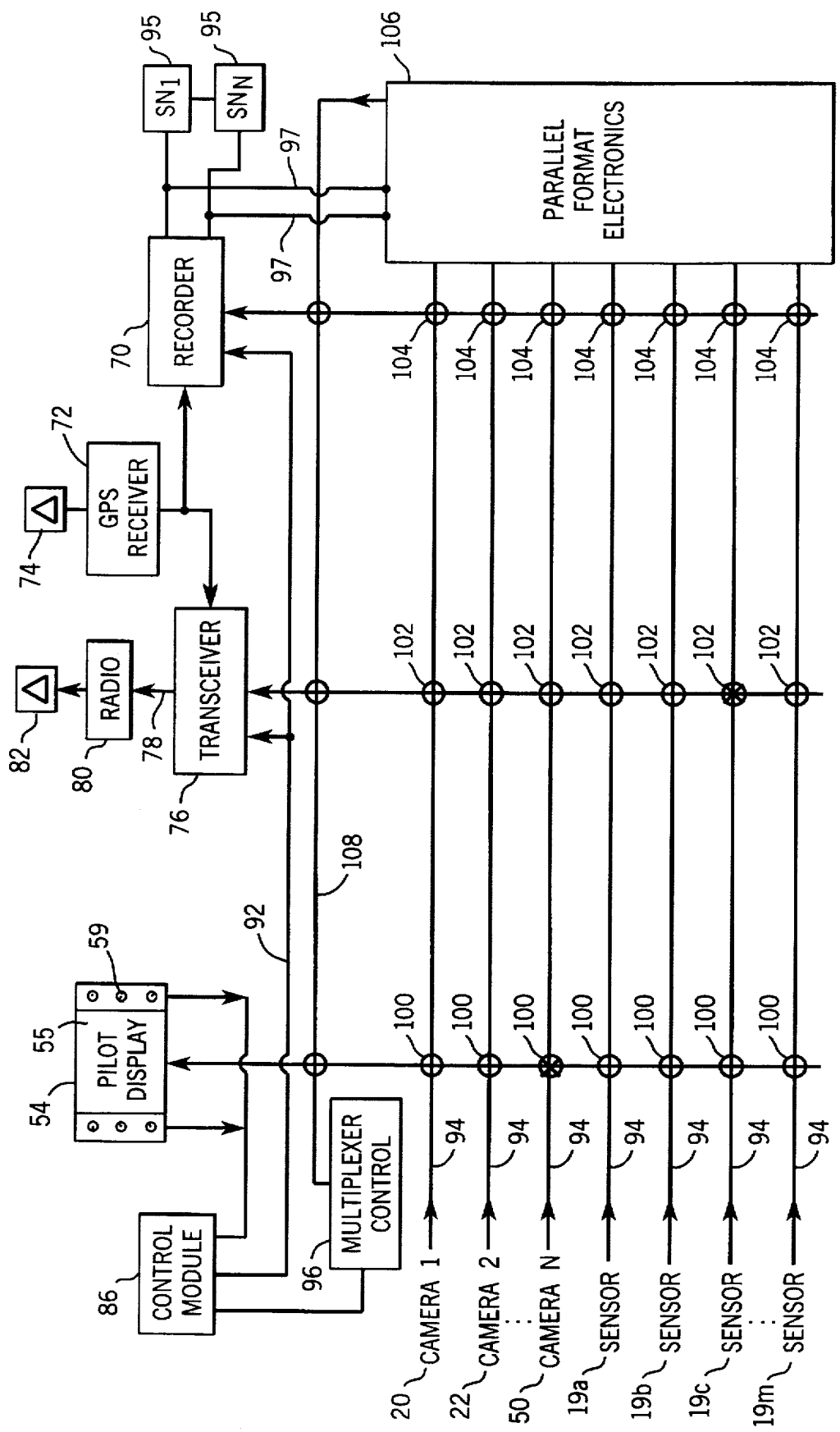
FIG. 12 is an alternative embodiment showing the acoustic system of the subject invention in combination with a multiple video imaging device system.

As shown in FIG. 12, the signals generated by various other components of the aircraft may also be collected for recording, transmission and monitoring utilizing the system of the subject invention, in combination with the acoustic sensors 19a–m, as indicated by the cameras 20 . . . 50, for example, or other sensors, as more fully shown and described in my aforementioned copending application. Such sensors would include any data signal desired to be incorporated in the comprehensive data system of the invention, such as, by way of example, the output signals produces by system monitoring transducers including, for example, engine temperature, oil and hydraulic pressure and the like. The system can also include data such as the radar signal, a chronology of the flight, global positioning and the like. This permits a comprehensive history of the flight as well as ready access to all available information by both the flight crew and a ground station.

The system may also incorporate a ground link communications capability, wherein any of the signals transmitted to antenna 60 may be introduced into an image transceiver 76 through the agile frequency receiver 66. The frequency receiver 66 provides an input to the image transceiver 76 which is adapted for generating a radio signal at 78 for input to an on board radio transceiver 80. The radio signal is transmitted to a ground station (not shown) via antenna 82.

The frequency receiver 64 provides a data/video signal to the monitor 55 of the cockpit control panel 54. The flight crew has can control the selection of cameras monitored at monitor 55 and can control the transmission of images to the ground station via radio 80. This is indicated by the control signals on line 84 from the control panel 54 to the control network 86. The control network 86 sends control signal out over a control transmission line or lines 88 to control the receivers 62, 64, 66 and the recorder 70 and the image transceiver 76. The operation of the video flight recorder and the frequency receivers is not intended to be accessible by the flight crew. In addition, the antenna 82 can receive unlinked video messages from a ground station. These signals are tied to the GPS signal and are both recorded at the recorder 70 and transmitted to the flight deck monitor 55. The recorder 70 may be a standard analog recorder, or may include digital hard drive systems or a random access digital memory, or other recording scheme as desired. The random access scheme would be particularly useful for having instant access to historical data while in flight. For example, if a terrorist was found to be on board, it would be useful to play back preceding activity to monitor the past actions by the terrorist before he was identified by the flight crew or ground tracking station. This could prove useful in determining a course of corrective action. As an example, it could assist with the location of weapons.

The frequency receivers 62, 64 and 66, the video recorder 70, the image transceiver 76, the GPS system 72 and the radio 80 utilize known technology well known to those skilled in the arts. The antennas 60, 74 and 80 are also of standard configuration. The control panel 54 and monitor 55 are of standard design, with the control panel utilizing electrical switches to activate and deactivate the crew controllable functions. The control system 86 is a solid state controller and may include firmware or software for controlling the automated functions which are not manually controlled by the crew or the ground personnel. The specific configuration of the control system is discretionary and is within the purview of those of ordinary skill in the art.

The present invention contemplates the use of synchronized multiplexing to maximize the capture of data/video signals from a plurality of sensors and transducers while minimizing the amount of hard physical equipment to store and process such a vast amount of information. One embodiment of the synchronizing system is shown in FIG. 3. As there shown, each of the plurality of imaging devices such as cameras C1–CN, such as, by way of example, the cameras 20–52, receive a master synchronizing signal from a master synchronizer via an input line 92. This assures that the raster scanned image captured by each camera is in synchronization with every other camera on the system and permits switching between cameras at monitor 55 without loss of full screen imaging. Each of the independent images captured by the cameras is output on a dedicated output line 94 into a switching matrix 96. The matrix permits selection of the image to be displayed at monitor 55. The video signal to the image transceiver 76 is also synchronized via the synchronizing system 90 and the specific image input to the transceiver 76 is controlled by a series of electronic switches 102. Likewise, the recorder is synchronized, with all of the video signal on the dedicated lines 94 being input into the recorder through a series of electronic switches 104. In reality, the monitor 55, image transceiver 76 and recorder 70 simply process whatever signal is present on their respective input lines 101, 103 and 105, operating in the normal, well-known manner. What makes the consolidation of equipment possible is the switching scheme utilized at the switch matrix 96 in order to capture and utilize a maximum amount of useful information in a minimum of data storage capacity requirements.

Figure 13:
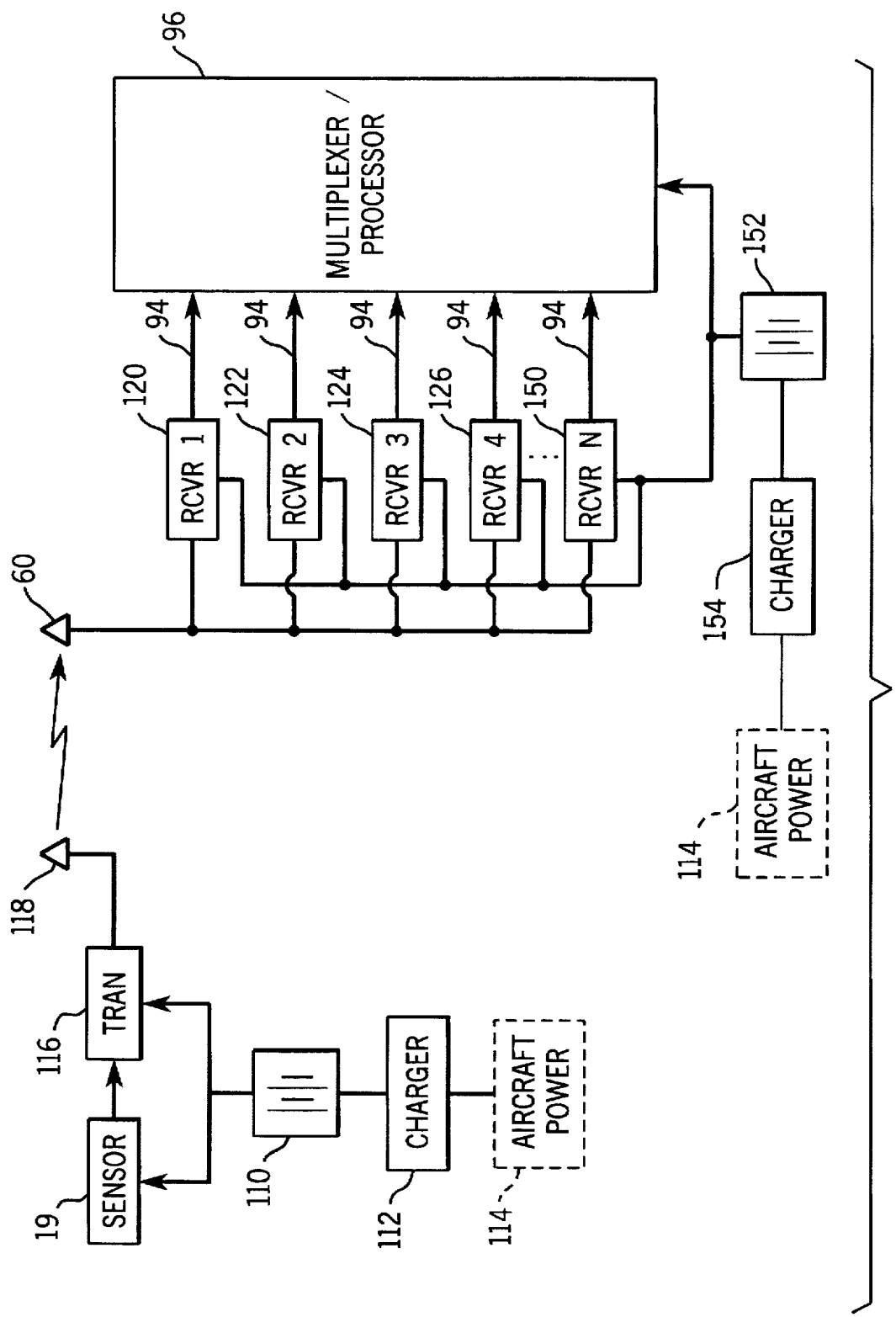
FIG. 13 is a block diagram illustrating a typical system utilizing a wireless transmission and receiving scheme in accordance with the invention.

Typically, the switching matrix control 96 is controlled via the master controller module 86. Each of the video signals 94 are input into a split screen network system 106, which is programmed by the control module 86 via control line 108. This permits the video signal input into the various processing stations 55, 76 and 70 to be split so that more than one image can be simultaneously displayed, transmitted or captured. For example, this would permit the crew to focus on the landing gear camera using a portion of the monitor while permitting the remaining images to scan through the normal sequence. Other split screen/sequencing schemes can also be used, as more fully described in my aforementioned copending application Turning now to FIG. 13, the wireless transmission system for use-on board the aircraft is shown in block form. Typically, each of the various sensors 19 will be mounted at the desired site and will include a self-contained power supply such as the rechargeable battery 110. This provides a fully integrated system which is operational even in the event of airframe failure or shut down of the aircraft power supply and backup systems. The battery will rely on a charging system 112 which is hardwired to the aircraft power system 114, but will continue to operate the camera in the event of aircraft power disruption for any reason. The sensor system also includes a self-contained transmitter 116 and an antenna 118 for transmitting the captured video signal via a dedicated low interference radio frequency. Each signal is received by an antenna 60 (see FIG. 5) and deciphered by matching receivers 120, 122, 124, 126 . . . 150, in one-to-one correspondence with the sensors 19a–19m to provide a unique acoustic data signal on each of the lines 94 as previously described, for providing input into the switching matrix 96 of the receiver/processing network. The receiver/processor network also include a dedicated, self contained power supply as indicated by the rechargeable battery 152 and the charging system 124, which is connected to the aircraft power system 114.

In operation, the acoustic signal and other data is processed and recorded for retrieval during reconstruction of a catastrophic event. Utilizing a multiplexed system as an example, the acoustic signal 19a–19m, each signal is introduced into the multiplexer for producing a combined digital acoustic signal, which may be processed as necessary by the processor. All of the acoustical data can be captured on a single channel using a cyclical sequence. For example, assuming twenty acoustical sensors and assuming an acoustical wave propagates at 1100 feet per second, the acoustic signal detection at each sensor should be monitored several times a second in order to determine the path, progress and change in the acoustic signal at each sensor. With a system incorporating twenty acoustic sensors, for example, if each sensor were monitored in a 1/10000 second interval, the sequence would be repeated every 0.002 seconds. During a 0.002 second interval the wave would travel approximately 2 feet. Thus, by tracking all of the signals in this manner, the location of the source of the sound would be able to be tracked to within two feet of the origin. More accurate pinpointing of the acoustic energy source could be achieved by using additional sensors and, where necessary, multiple channel recording as more fully described in my aforementioned copending application.

The acoustic sensors, synchronizing networks and multiplexing hardware are well known and their adaptation will be readily apparent to those of ordinary skill in the art. Any suitable recording format can be used, for example, an analog video tape recorder, a digitizer and hard drive/optical drive configuration, or a digitizer, compressor, hard drive/optical drive configuration. As digital technology becomes more readily available and more cost effective, it is contemplated that most of the imaging, monitoring and-recording equipment will be of a digital format because of the increased reliability and the minimized space requirements The acoustic sensor, monitoring and recording system of the subject invention provides a low cost system for detecting failures or terrorist events in commercial aviation well adapted for assisting in the detection and post event analysis of such events. When used in combination with a comprehensive multi-media safety and surveillance system is provided, which in the preferred form provides both visual and audio information as well as critical data, a comprehensive system for providing information to the flight crew, and to a ground tracking station, and also for recording the information and data generated during flight. In addition, the permanent tape record will prove invaluable for investigating the causes of an in flight catastrophe or malfunction. The system is specifically designed for new commercial aircraft but is equally well-suited for retrofit applications and for other safety applications as well. While certain features and embodiments of the invention have been described in detail herein, it will be readily understood that the invention encompasses all modifications and enhancements within the scope and spirit of the following claims.

What is claimed is:

1. A wireless acoustic sensor and data generation system for providing in flight safety and surveillance for aircraft, the system comprising:

a. a plurality of acoustic sensors each adapted for monitoring a selected condition aboard the aircraft, each sensor adapted for generating a unique data signal representing the specific condition to be monitored at a specific location;

b. a collector adapted for collecting the plurality of sensors and generating therefrom a combined signal incorporating each of the plurality of signals into combined output signal; and c. a processing system for receiving and processing the combined output signal, wherein said sensors are adapted for transmitting the data signal to the collector and processing system via wireless radio frequency transmission.

2. The system of claim 1, further including means for tracking the time each signal is generated.

3. The system of claim 1, further including means for tracking the navigational coordinates of the aircraft when each signal is generated.

4. The system of claim 1, the processing system further including a recorder for recording each of said signals, whereby the signals may be used for reconstructing the time and location of an acoustic event.

5. The system of claim 1, including a plurality of acoustic sensor devices each adapted for generating an audio signal, the collector further including a multiplexer subsystem for combining the plurality of acoustic signals into a combined acoustic.

6. The system of claim 5, wherein one of said acoustic signals is an analog signal and wherein one of said acoustic signals is a digital signal, the multiplexer further including an analog to digital converter for converting the analog signal into a converted digital signal, the multiplexer subsystem adapted for multiplexing the converted digital audio signal and the digital signal into a combined digital acoustic signal.

7. The system of claim 5, wherein one of said acoustic signals is an analog signal and wherein one of said acoustic signals is a digital signal, the multiplexer further including a digital to analog converter for converting the digital signal into a converted analog signal, the multiplexer subsystem adapted for multiplexing the converted analog signal and the analog signal into a combined analog acoustic signal.

8. The system of claim 1, wherein said combined signal includes specific, time sequenced interval segments of the plurality of data signals in a serial format.

9. The system of claim 1, wherein said combined signal includes the plurality of signals released simultaneously in a compressed, parallel format.

10. The system of claim 1, wherein the processing system further includes a recorder for capturing the output combined output signal in a retrievable format.

11. The system of claim 10, wherein the recorder is a single channel, analog recorder.

12. The system of claim 10, wherein the recorder is a digital random access memory device.

13. The system of claim 1, wherein the processing system further includes a transmitter adapted for wireless transmission of the combined output signal to a remote location, whereby the combined output signal may be downloaded from the system.

14. The system of claim 13, wherein the processing further includes a receiver adapted for receiving wireless transmission of data signals from a remote location, whereby a data signal may be uploaded onto the system from a remote location.

15. The system of claim 1, wherein each sensor includes a transmitter for generating a data signal to be transmitted and the collector and processing system includes a receiver device for accepting the transmitted data signal.

16. The system of claim 15, wherein each sensor includes a transmitter for generating a data signal on a unique frequency and wherein the receiver device comprises a frequency agile receiver adapted for maintaining the identity of each transmitted data signal.

17. The system of claim 16, wherein each sensor includes a transmitter for generating a data signal on a unique frequency and wherein the receiver device comprises a dedicated receiver for each of the plurality of transmitted data signals.

18. The system of claim 1, wherein each sensor further includes a self-contained power supply.

19. The system of claim 1, further including a global positioning system producing an output position signal adapted to be incorporated into the combined output signal.

20. The system of claim 1, the collector further includes a multiplexing system adapted for accepting a plurality of parallel data signals simultaneously and for generating therefrom a single, combination output signal.

21. The system of claim 20, wherein said combination output signal includes a plurality of the data signals combined in a serial, time interval repeat sequence.

* * * * *